US008767034B2

(12) United States Patent
Setton (10) Patent No.: US 8,767,034 B2
(45) Date of Patent: Jul. 1, 2014

(54) AUGMENTING A VIDEO CONFERENCE (75) Inventor: Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 251 days.

(21) Appl. No.: 13/309,410

(22) Filed: Dec. 1, 2011

(65) Prior Publication Data
US 2013/0141515 A1 Jun. 6, 2013

(51) Int. Cl.
*H04N 7/15* (2006.01)
(52) U.S. Cl.
CPC ........................................ *H04N 7/15* (2013.01)
USPC .................... 348/14.03; 348/14.07; 348/14.08
(58) Field of Classification Search
CPC ........... H04N 7/14; H04N 7/15; H04N 7/147; H04N 7/142; H04N 7/152; H04L 29/06027; H04L 29/06414
USPC ............................. 348/14.01–14.16; 709/204; 270/260–261
See application file for complete search history.

(56) References Cited

U.S. PATENT DOCUMENTS

| 5,347,306 | A | 9/1994 | Nitta |
| 6,414,707 | B1 | 7/2002 | Agraharam et al. |
| 8,199,184 | B2 | 6/2012 | Shaffer et al. |
| 8,593,502 | B2 | 11/2013 | Saleh et al. |
| 2001/0040621 | A1* | 11/2001 | Gerszberg et al. .......... 348/14.01 |
| 2006/0259552 | A1* | 11/2006 | Mock et al. .................... 709/204 |
| 2009/0049464 | A1* | 2/2009 | Kang ................................ 725/1 |
| 2009/0115835 | A1 | 5/2009 | Shaffer et al. |
| 2010/0175026 | A1* | 7/2010 | Bortner et al. ................ 715/818 |
| 2011/0234746 | A1* | 9/2011 | Saleh et al. ................. 348/14.03 |
| 2012/0050323 | A1* | 3/2012 | Baron et al. .................. 345/632 |
| 2012/0062687 | A1* | 3/2012 | Sai et al. ..................... 348/14.03 |
| 2013/0070045 | A1* | 3/2013 | Meek .......................... 348/14.07 |

FOREIGN PATENT DOCUMENTS

JP 11191765 A 7/1999
KR 1020060047954 A 5/2006

OTHER PUBLICATIONS

"International Search Report and Written Opinion", Feb. 19, 2013, 8 pages.

* cited by examiner

*Primary Examiner* — Melur Ramakrishnaiah (57) ABSTRACT

A computer-implemented method for augmenting a video conference between a first device and a second device. The method includes: receiving a selection of a selectable animation, via a selection of a selectable animation representation, at the first device, wherein the selectable animation is configured for augmenting the video conference; and incorporating the selection of the selectable animation into the video conference.

24 Claims, 6 Drawing Sheets

```
RECEIVE A SELECTION OF A SELECTABLE ANIMATION, VIA A SELECTION OF A
SELECTABLE ANIMATION REPRESENTATION, AT A FIRST DEVICE, WHEREIN THE
SELECTABLE ANIMATION IS CONFIGURED FOR AUGMENTING A VIDEO CONFERENCE
405
```
↓
```
INCORPORATE THE SELECTION OF THE SELECTABLE ANIMATION INTO THE VIDEO
CONFERENCE
410
```
```
DISPLAY A SELECTABLE IMAGE REPRESENTING A SET OF SELECTABLE ANIMATION
REPRESENTATIONS, WHEREUPON, A SELECTION OF THE SELECTABLE IMAGE RENDERS A
DISPLAY OF THE SET OF SELECTABLE ANIMATION REPRESENTATIONS
415
```
↓
```
IN RESPONSE TO RECEIVING A SELECTION OF THE SELECTABLE IMAGE, DISPLAYING
THE SET OF SELECTABLE ANIMATION REPRESENTATIONS
420

DISPLAYING THE SET OF SELECTABLE ANIMATION REPRESENTATIONS IN AN
    ANIMATION CONTROL BAR THAT REPLACES AN EXISTING CONTROL BAR ON A
    DISPLAY SCREEN OF THE FIRST DEVICE
    425

DISPLAYING THE SET OF SELECTABLE ANIMATION REPRESENTATIONS IN A LIST
    FORMAT
    430

DISPLAYING THE SET OF SELECTABLE ANIMATION REPRESENTATIONS IN A
    CAROUSEL FORMAT
    435
```
```
DISPLAY A SET OF SELECTABLE ANIMATION REPRESENTATIONS AT THE FIRST DEVICE
440
```
```
MANIPULATE, AT THE FIRST DEVICE, THE SELECTION OF THE SELECTABLE ANIMATION
INCORPORATED IN THE VIDEO CONFERENCE
445
```
```
MANIPULATE, AT THE SECOND DEVICE, THE SELECTION OF THE SELECTABLE ANIMATION
INCORPORATED IN THE VIDEO CONFERENCE
450
```
```
DISPLAY AT THE SECOND DEVICE, AT THE END OF THE VIDEO CONFERENCE,
PURCHASING INFORMATION ASSOCIATED WITH A SET OF SELECTABLE ANIMATION
REPRESENTATIONS
455
```
```
DISPLAY AT THE FIRST DEVICE, AT THE END OF THE VIDEO CONFERENCE, PURCHASING
INFORMATION ASSOCIATED WITH A SET OF SELECTABLE ANIMATION REPRESENTATIONS
460
```

```
┌─────────────────────────────────────────────────────────────────┐
│ RECEIVE A SELECTION OF A SELECTABLE ANIMATION, VIA A SELECTION OF A │
│ SELECTABLE ANIMATION REPRESENTATION, AT A FIRST DEVICE, WHEREIN THE │
│ SELECTABLE ANIMATION IS CONFIGURED FOR AUGMENTING A VIDEO CONFERENCE │
│                              505                                 │
└─────────────────────────────────────────────────────────────────┘
                                │
                                ▼
┌─────────────────────────────────────────────────────────────────┐
│ INCORPORATE THE SELECTION OF THE SELECTABLE ANIMATION INTO THE VIDEO │
│                          CONFERENCE                              │
│                              510                                 │
└─────────────────────────────────────────────────────────────────┘
                                │
                                ▼
┌─────────────────────────────────────────────────────────────────┐
│ DISPLAY, AT THE SECOND DEVICE, PURCHASING INFORMATION ASSOCIATED WITH │
│                   THE SELECTABLE ANIMATION                       │
│                              515                                 │
│ ┌─────────────────────────────────────────────────────────────┐ │
│ │ DISPLAY, AT THE SECOND DEVICE, AT THE END OF THE VIDEO CONFERENCE, THE │ │
│ │  PURCHASING INFORMATION ASSOCIATED WITH THE SELECTABLE ANIMATION │ │
│ │                            520                              │ │
│ └─────────────────────────────────────────────────────────────┘ │
│                                                                 │
│ ┌─────────────────────────────────────────────────────────────┐ │
│ │ DISPLAY, AT THE FIRST DEVICE, AT THE END OF THE VIDEO CONFERENCE, THE │ │
│ │  PURCHASING INFORMATION ASSOCIATED WITH THE SELECTABLE ANIMATION │ │
│ │                            525                              │ │
│ └─────────────────────────────────────────────────────────────┘ │
│                                                                 │
│ ┌─────────────────────────────────────────────────────────────┐ │
│ │ DISPLAY AN ANIMATION PACKAGE AVAILABLE FOR A LIMITED NUMBER OF DAYS FOR │ │
│ │                       A COST TO A USER                      │ │
│ │                            530                              │ │
│ └─────────────────────────────────────────────────────────────┘ │
│                                                                 │
│ ┌─────────────────────────────────────────────────────────────┐ │
│ │ DISPLAY AN ANIMATION PACKAGE AVAILABLE FOR A LIMITED NUMBER OF DAYS FOR │ │
│ │                      NO COST TO A USER                      │ │
│ │                            535                              │ │
│ └─────────────────────────────────────────────────────────────┘ │
│                                                                 │
│ ┌─────────────────────────────────────────────────────────────┐ │
│ │   DISPLAY A FIRST SET OF SELECTABLE PURCHASING INFORMATION IMAGES, │ │
│ │ WHEREUPON IN RESPONSE TO RECEIVING A SELECTION OF THE FIRST SET OF │ │
│ │ SELECTABLE PURCHASING INFORMATION IMAGES, DISPLAYING A FIRST SET OF │ │
│ │               DETAILS OF THE PURCHASING INFORMATION         │ │
│ │                            540                              │ │
│ └─────────────────────────────────────────────────────────────┘ │
│                                                                 │
│ ┌─────────────────────────────────────────────────────────────┐ │
│ │  DISPLAY A SECOND SET OF SELECTABLE PURCHASING INFORMATION IMAGES, │ │
│ │ WHEREUPON IN RESPONSE TO RECEIVING A SELECTION OF THE SECOND SET OF │ │
│ │ SELECTABLE PURCHASING INFORMATION IMAGES, DISPLAYING A SECOND SET OF │ │
│ │              DETAILS OF THE PURCHASING INFORMATION          │ │
│ │                            545                              │ │
│ └─────────────────────────────────────────────────────────────┘ │
└─────────────────────────────────────────────────────────────────┘
                                │
                                ▼
┌─────────────────────────────────────────────────────────────────┐
│ DISPLAY, AT THE FIRST DEVICE, THE PURCHASING INFORMATION ASSOCIATED WITH │
│                   THE SELECTABLE ANIMATION                       │
│                              550                                 │
└─────────────────────────────────────────────────────────────────┘
```

AUGMENTING A VIDEO CONFERENCE

BACKGROUND

Participants in a video conference communicate with one another by transmitting audio/video signals to one another. For example, participants are able to interact via two-way video and audio transmissions simultaneously. However, the participants may not be able to completely articulate what they are attempting to communicate to one another based solely on the captured audio captured by microphones and video signals captured by video cameras.

BRIEF DESCRIPTION OF THE DRAWINGS

FIG. 4 illustrates an example of a method for augmenting a video conference, in accordance with embodiments.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
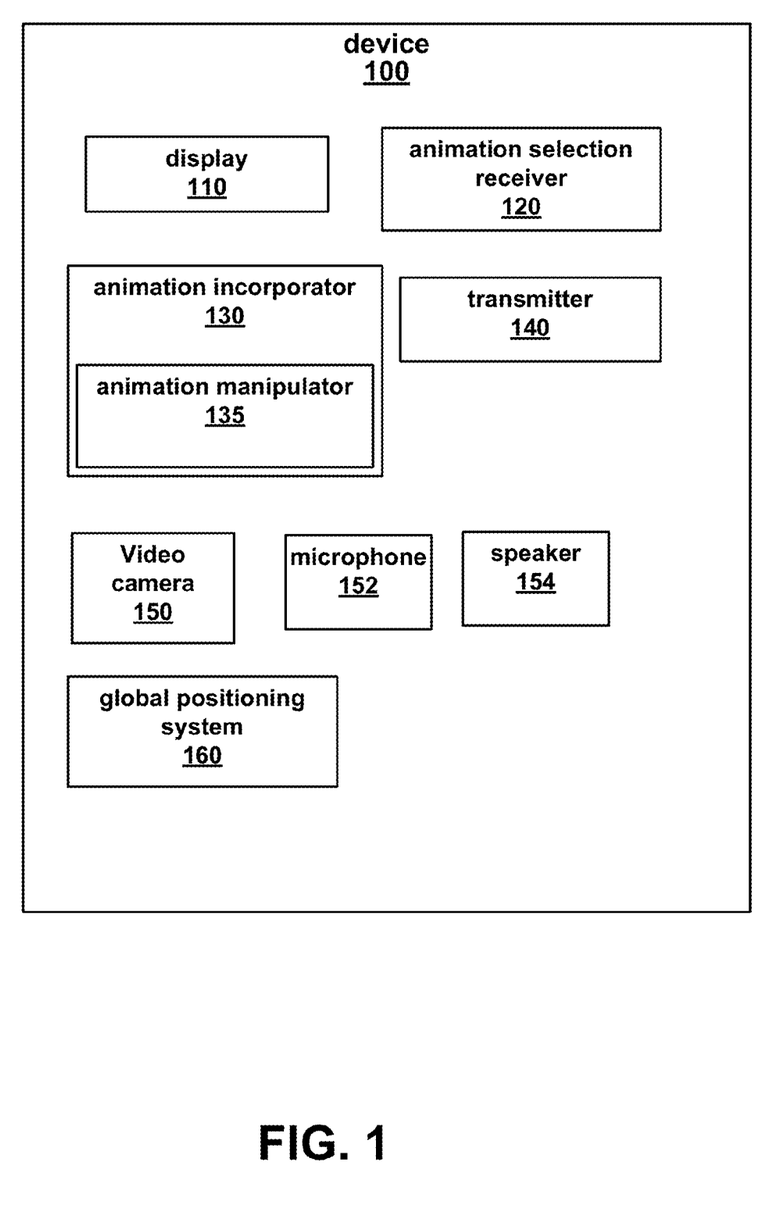
FIGS. 1 and 2 illustrate examples of devices, in accordance with embodiments.
Figure 2:
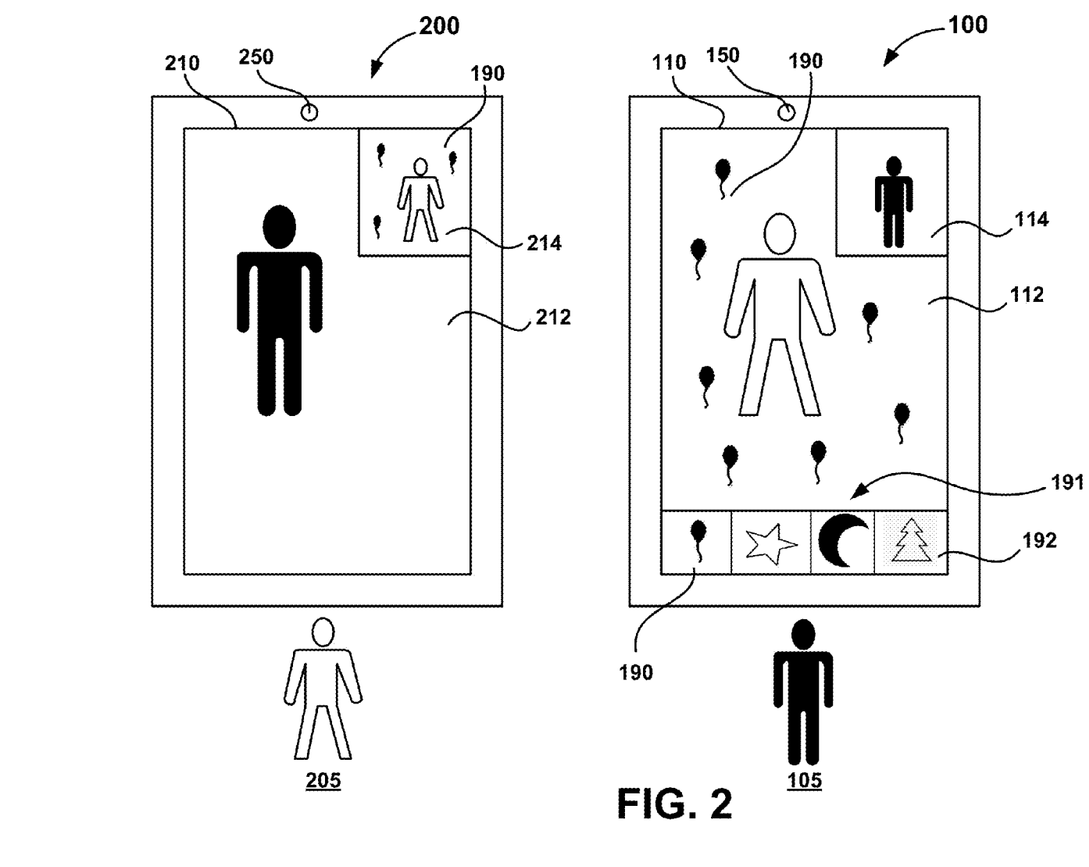

FIG. 1 depicts an embodiment of device 100. Device 100 is configured for participation in a video conference. FIG. 2 depicts devices 100 and 200 participating in a video conference. In general, video conferencing allows two or more locations to interact via multi-way video and audio transmissions simultaneously.

The discussion below will first describe the components of device 100. The discussion will then describe the functionality of the components of device 100 during a video conference between devices 100 and 200. Devices 100 and 200 are any communication devices (e.g., laptop, desktop, smartphones, tablets, TV, etc.) capable of participating in a video conference. In various embodiments, device 100 is a handheld mobile device, such as smart phone, personal digital assistant (PDA), and the like.

Moreover, for clarity and brevity, the discussion will focus on the components and functionality of device 100. However, device 200 operates in a similar fashion as device 100. In one embodiment, device 200 is the same as device 100 and includes the same components as device 100.

Device 100 includes display 110, animation selection receiver 120, animation incorporator 130, transmitter 140, camera 150, microphone 152 and speaker 154. Device 100 optionally includes global positioning system 160.

Display 110 is configured for displaying video captured at device 200. In another embodiment, display 110 is further configured for displaying video captured at device 100.

Animation selection receiver 120 is configured to access a selectable animation. A selectable animation is configured for augmenting a video conference, which will be described in detail below.

Animation incorporator 130 is configured for incorporating the selection of the selectable animation 190 into the video conference. For example, animation incorporator 130 is configured for incorporating the selectable animation into a video captured at device 100 and/or device 200. In one embodiment, the animation incorporator 130 includes an animation manipulator 135 that is configured to enable manipulation of the animation in the video conference.

Transmitter 140 is for transmitting data (e.g., animation, control code).

Optionally, device 100 includes one or more of the following: a video camera 150; a microphone 152; a speaker 154; and a global positioning system 160. Video camera 150 is for capturing video at device 100. Microphone 152 is for capturing audio at device 100. Speaker 154 is for generating an audible signal at device 100.

Global positioning system 160 is for determining a location of a device 100.

Referring now to FIG. 2, devices 100 and 200 are participating in a video conference with one another. In various embodiments, more than two devices participate in a video conference with each another.

During the video conference, video camera 250 captures video at device 200. For example, video camera 250 captures video of user 205 of device 200.

Video camera 150 captures video at device 100. For example, video camera 150 captures video of user 105. It should be appreciated that video cameras 150 and 250 capture any objects that are within the respective viewing ranges of cameras 150 and 250.

Microphone 152 captures audio signals corresponding to the captured video signal at device 100. Similarly, a microphone of device 200 captures audio signals corresponding to the captured video signal at device 200.

The video captured at device 200 is transmitted to and displayed on display 110 of device 100. For example, a video of user 205 is displayed on a first view 112 of display 110. Moreover, the video of user 205 is displayed on a view 214 of display 210.

The video captured at device 100 is transmitted to and displayed on display 210 of device 200. For example, a video of user 105 is displayed on first view 212 of display 210. Moreover, the video of user 105 is displayed on a second view 114 of display 110.

In one embodiment, the audio signals captured at devices 100 and 200 are incorporated into the captured video. In another embodiment, the audio signals are transmitted separate from the transmitted video.

As depicted, first view 112 is the primary view displayed on display 110 and second view 114 is the smaller secondary view displayed on display 110. In various embodiments, the size of both first view 112 and second view 114 are adjustable. For example, second view 114 can be enlarged to be the primary view and view 112 can be diminished in size to be a secondary view. Moreover, either one of views 112 and 114 can be closed or fully diminished such that it is not viewable.

Animation selection receiver 120 receives a selection of a selectable animation 190, via receiving a selection of a selectable animation representation (e.g., an image representing an animation), for augmenting the video conference. An animation is a simulation of movement created by displaying a series of pictures, or frames. In embodiments, animations themselves can be received at device 100 from a server or device 200 and animations can be received at different times. For example, animations can be received when an augmenting application is downloaded onto device 100, during login, or in real-time, when the animations are instructed to be incorporated into the video conference. Further, by not limited to, animations can be received by being downloaded with a video conferencing application, by being downloaded later on as part of a selection (e.g., digital catalog), by being downloaded during a call, by being downloaded when the user interacts with the application, by being downloaded when the application is updated.

Figure 6:
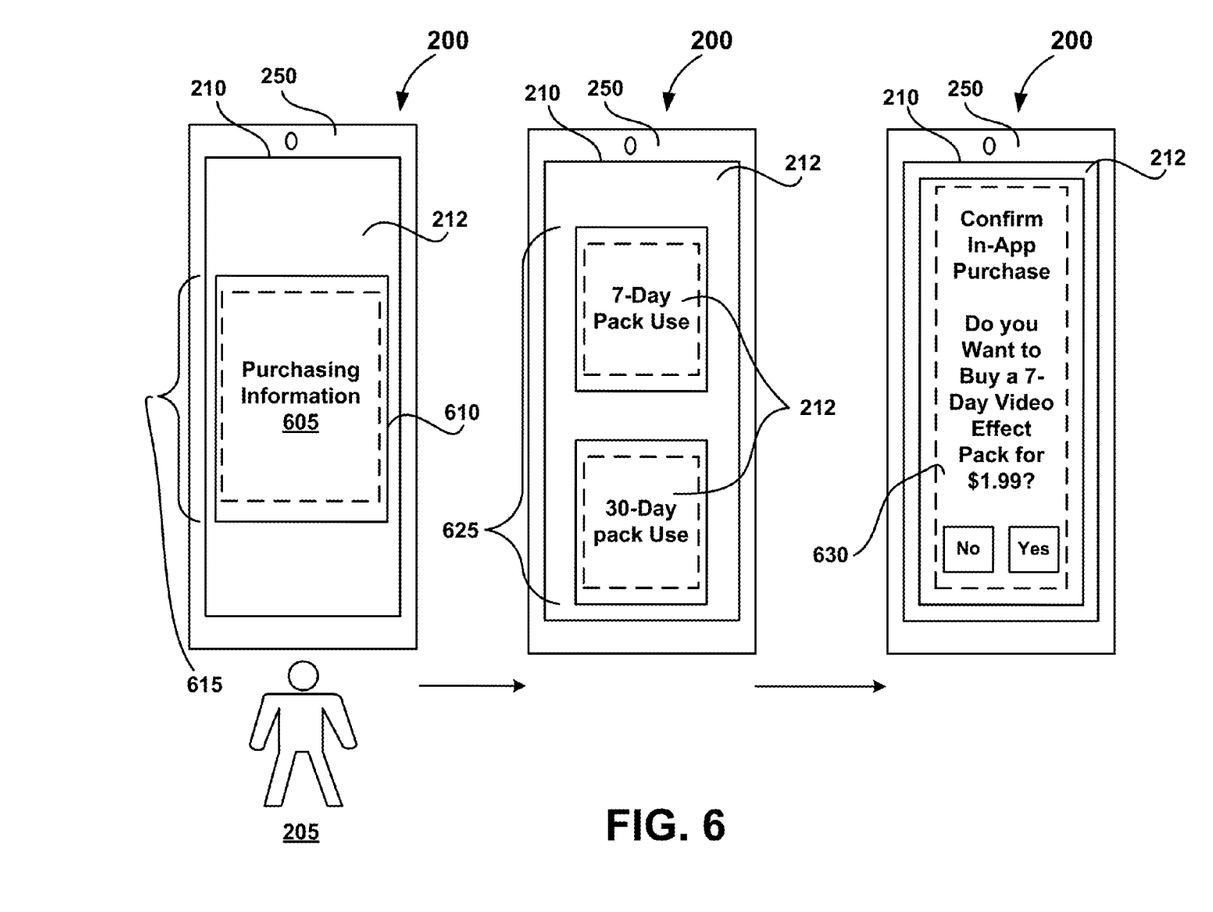
FIG. 6 illustrates an example of a device, in accordance with an embodiment.

The set of selectable animation representations 191 that are depicted in FIGS. 2 and 6 (e.g., star, palm tree, flower, rain cloud) are merely a few of any number of examples of animations. It should be appreciated that the set of selectable animation representations 191 may include one or more selectable animation representations. It should be appreciated that an animation can be any object that is capable of augmenting a video conference. In other words, an animation can be any object that is able to supplement the communication between participants in a video conference. For example, animations can be, but are not limited to, a kiss, heart, emoticon, high-five, background (photo-booth type of effects), color space changes, and/or image process changes (e.g., thinning, fattening), or avatars.

It should also be appreciated that is not limited to a viewable animation. For example, an animation can be one of a plurality of sounds, or sounds and video. Additionally, the animations may not necessarily be pre-determined. For example, the displaying of the animations may be a result of an interaction with the user of the application.

In one embodiment, the set of selectable animation representations 191 are displayed on display 110 for viewing by user 105. For example, the set of selectable animation representations 191 are displayed on the animation display bar 192. In one embodiment, the animation display bar 192 is overlaid with first view 112. In another embodiment, the animation display bar 192 is displayed concurrently with first view 112 and/or second view 114.

In various embodiments, the animation display bar 192 is displayed in response to user input, such as, but not limited to key stroke, cursor movement, a detected touch on a touch screen, and designated movement by a user (e.g., expressions, winking, blowing a kiss, hand gesture and the like).

Animation incorporator 130 facilitates in incorporating selectable animation 190 into the video conference. In one embodiment, at device 100, animation incorporator 130 incorporates selectable animation 190 into the video captured at device 200. For example, selectable animation 190 is incorporated above the head of user 205. Therefore, as depicted, video captured at device 200 is incorporated with the selectable animation 190 and the augmented video is displayed at least at device 200. Also, the augmented video with incorporated selectable animation 190 is displayed at device 100.

In one embodiment, user 105 selects selectable animation 190 in the animation display bar 192 and drags the selectable animation 190 to and places it at a location designated by user 105 (e.g., above the head of user 205, as displayed on first view 112). Once placed at the designated location, animation incorporator 130 incorporates animation at the designated location.

In another embodiment, animation incorporator 130 generates control code. The control code instructs how selectable animation 190 is to be incorporated into the video captured at device 200.

For example, control code can be transmitted directly to device 200 to instruct device 200 how selectable animation 190 is to be incorporated into video displayed at device 200. In such an example, control code signals or instructs device 200 that selectable animation 190 is to be displayed in the video conference. In another example, the control code is sent to a server, device 200 then receives the control code from the server and/or corresponding animation.

FIG. 2 depicts the selectable animation 190 incorporated into the video conference. However, it should be appreciated that any number of selectable animations can be incorporated into the video conference at any time. For example, five different animations, represented by selectable animation representations, which are selected from the set of selectable animation representations, may be concurrently incorporated into the video conference.

It should be appreciated that the term "incorporate" used herein, is used to describe that a selectable animation 190 is merely displayed along with some portion of the video conference. As such, the selectable animation 190 is merely displayed concurrently with some portion of the video conference. Accordingly, the selectable animation 190 is understood to be incorporated into the video. However, it is not understood that the selectable animation 190 is integrated with or made part of the video stream.

In one embodiment, the selectable animation 190 is superimposed as an overlay on a video. As such, a selectable animation 190 is concurrently superimposed as an overlay displayed on devices 100 and 200. For example, a selectable animation 190 is concurrently overlaid on video displayed in view 112 and view 214 (as depicted in FIG. 2), and a selectable animation can be concurrent overlaid on video displayed in view 114 and view 212 (as depicted in FIG. 6).

In another embodiment, the selectable animation 190 is integrated into the bit stream of the video conference.

In another example, a selectable animation 190 is concurrently overlaid on video displayed in view 112 and view 212. Also, the selectable animation 190 is displayed in a portion of a display independent of the views at the devices and does not require a two-way video to be active (e.g., a one-way video could be active).

It should be noted that the various embodiments described herein can also be used in combination with one another. That is one described embodiment can be used in combination with one or more other described embodiments.

In one embodiment, transmitter 140 then transmits the video captured at device 200, which now includes selectable animation 190, to device 200 (hereinafter, also known as the "second device 200") such that the video including selectable animation 190 is displayed on display 210. In another embodiment, transmitter 140 transmits control code to device 200 (or a server) to instruct device 200 how selectable animation 190 is to be incorporated into the video conference.

Animation manipulator 135 manipulates incorporated selectable animation 190. In one embodiment, selectable animation 190 is manipulated at device 100. For example, in response to user input at a touch screen, user 105 rotates selectable animation 190 clockwise. Accordingly, video captured at device 200 (and displayed on device 100 and/or device 200) is augmented such that the selectable animation 190 spins clockwise.

In another embodiment, selectable animation 190 is manipulated at device 200. For example, in response to user 205 moving his head from left to right, selectable animation 190 is manipulated (via an animation manipulator of device 200) such that it moves from left to right with respect to the head movement of user 205. Accordingly, video captured at device 200 (and displayed on device 100 and/or device 200) is augmented such that selectable animation 190 is moved from left to right.

In a further embodiment, selectable animation 190 is concurrently manipulated at device 100 and device 200. For example, in response to user 205 moving his head from left to right and user 105 spinning the selectable animation 190 (as described above), selectable animation 190 is manipulated such that it concurrently moves from left to right with respect to the head movement of user 205 and spins in response to input from user 105. Accordingly, video captured at device 200 (and displayed on device 100 and/or device 200) is augmented such that selectable animation 190 is moved from left to right while spinning clockwise.

In a further embodiment, selectable animation 190 is directionally manipulated. For example, user 105 sends a "punch" animation (e.g., fist, boxing glove) to user 205. Accordingly, user 105 views the "punch" animation going into display 110 and user 205 views the "punch" animation coming out of display 210.

It should be appreciated that animations are manipulated in response to a variety of inputs. For example, animations can be manipulated via sounds, gestures, expressions, movements, etc. Various examples are: in response to a wink of a user, an animation (e.g., a star) comes out of the eye of the user; and in response to a kiss by a user, red lips fly out of the mouth of the user.

In one embodiment, the set of selectable animation representations 191 are not displayed on display 110 and/or animation display bar 192 until there is at least one of a variety of inputs, as described above. For example, an animation of a heart is not displayed until there is tapping on a touch screen.

Any number of animations can be accessed and/or selected to be incorporated into the video conference. In one embodiment, the set of selectable animation representations 191 are geographical-related animations. For example, the set of selectable animations 191 are based on a location of devices 100 and/or 200.

In particular, if device 100 is located in Hawaii, then the set of selectable animation representations 191 are related to that location. For example, geographical-related animations, based on a location in Hawaii determined from GPS 160, could be, but are not limited to, a surfboard, sun, palm tree, coconut, etc.

It should be appreciated that the determination of location can be provided in a variety of ways. For example, the determination of a location of a device can be based on information provided by a user upon registrations, an IP address of the device or any other method that can be used to determine location.

In another embodiment, the set of selectable animations 191 are temporal-related animations based on a time of the video conference. For example, if the video conference occurs on or around Christmas, then animations would be Christmas related (e.g., stocking, Christmas tree, candy cane, etc.). In another example, if the video conference occurs in the evening, then animations would be associated with the evening (e.g., moon, stars, pajamas, etc.)

In a further embodiment, the set of selectable animation representations 191 are culturally-related animations. For example, if user 105 and/or user 205 are located in Canada, then the set of selectable animation representations 191 could be, but are not limited to, a Canadian flag, hockey puck, curling stone, etc.

In yet another embodiment, the set of selectable animation representations 191 is available and/or accessed based on account status. For example, user 105 has a payable account to have access to the set of selectable animation representations 191. If user 105 has provided adequate payment to the account, then user 105 is able to access the set of selectable animation representations 191. In contrast, if user has not provided adequate payment to the account, then user 105 is unable to access the set of selectable animation representations 191.

Moreover, use and selection of animations can be specifically related to events, holidays, special occasions and the like. Holidays can be, but are not limited to, religious holidays (e.g., Christmas, Easter, Yom Kippur, etc.), national holidays (e.g., New Years, Presidents Day, Memorial Day, etc.) or any other observed holiday (official or unofficial). Events or special occasions can be, but are not limited to, birthdays, anniversaries, graduation, weddings, new job, retirement and the like.

In one example, on or around Thanksgiving, animations of a turkey, pumpkin pie, a Pilgrim and the like are selected and/or used. In another example, on or around St. Patrick's Day, animations of a shamrock, a pot of gold, and a leprechaun are selected and/or used. In a further example, on or around Easter, animations of an Easter bunny and Easter eggs are selected and/or used.

In one embodiment, a user is prompted (by a prompt) to utilize an animation specifically related to events, holidays, special occasions and the like. (It should be understood that the term "prompt" used herein may be any functionality that provides for serving to suggest or remind a user of an action that may be taken. In one embodiment, a prompt may be a pop-up that suggests an action that may be taken. The pop-up may appear in response to a keystroke or another action taken by a user. In another embodiment, a prompt may be a button or the like (that is not a pop-up) that displays text. The button or the like may be displayed during the entirety a particular screen that is presented to the user.)

For example, on or around the Fourth of July, a user is prompted to select and/or use animations (e.g., fireworks) specifically related to the Fourth of July. In particular, the animations are presented to a user and the user is prompted to send the animations to another user in the videoconference. In other words, the animations are incorporated into the video conference.

In another embodiment, a user can be prompted to send an animation to another user where a relationship between the parties is suspected, known, or inferred. For example, a mother is speaking with her son over a video conference. If the mother/son relationship is suspected, known, or inferred, then the son is prompted to utilize animations (e.g., flowers) specifically related to Mother's Day.

The relationship can be determined in a variety of ways. For example, the relationship can be determined based on, but not limited to, surname, location of users, call logs, etc.

Moreover, the son may be prompted with a message, such as "This appears to be your mother. Is this correct?" As such, if the son responds that he is speaking with his mother, then the son is prompted to utilize animations (e.g., flowers) specifically related to Mother's Day.

It should also be appreciated that animations can enhance revenue stream. For example, 100,000 animations are used on Valentine's Day, and there is a $0.50 fee for each animation. As a result, $50,000 in fees is accumulated on Valentine's Day.

Figure 3:
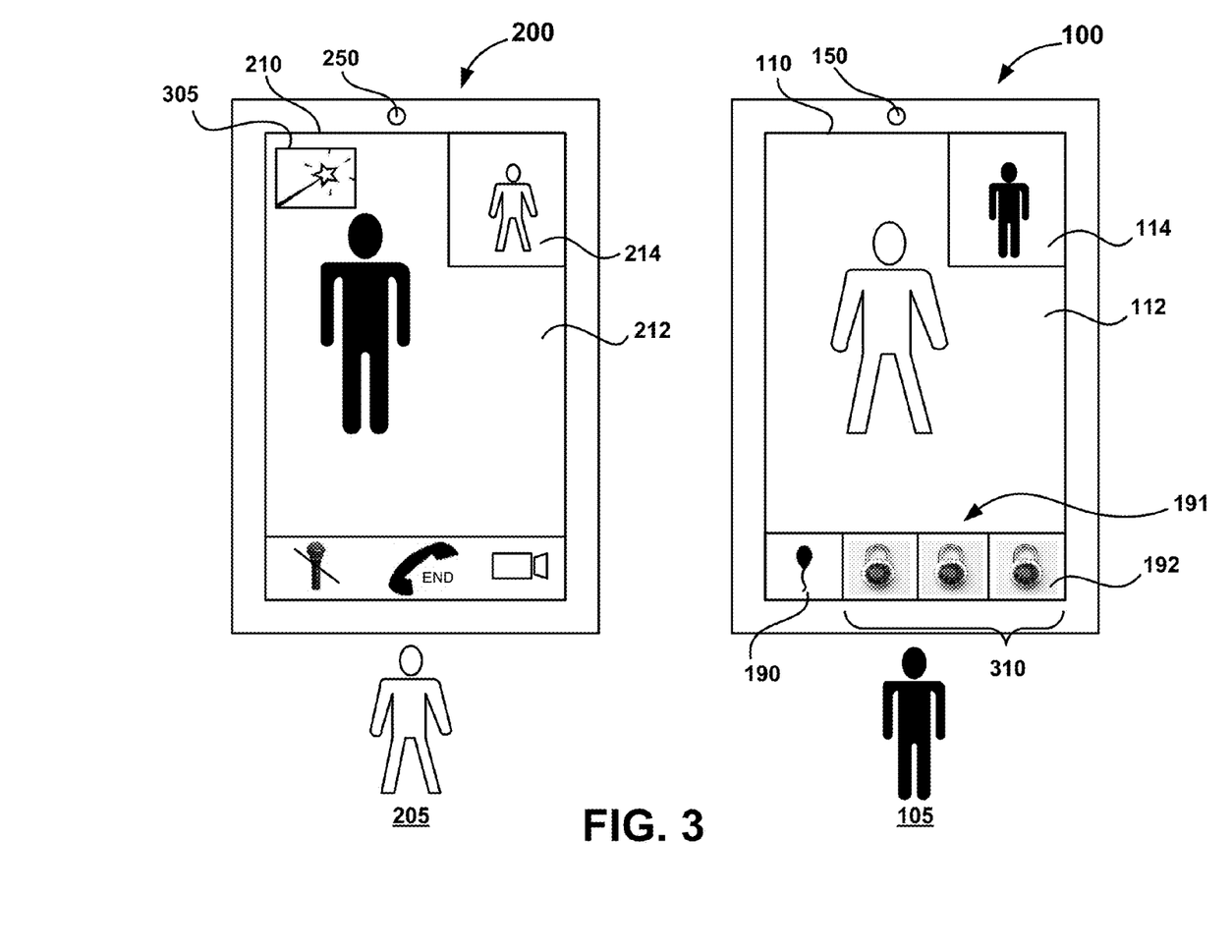
FIG. 3 illustrates an example of a device, in accordance with embodiments.

FIG. 3 illustrates an example device in accordance with embodiments. Selectable image 305 is an image that may be selected (via touch), thereby rendering a set of selectable animation representations 191 in the animation display bar 192.

Figure 5:
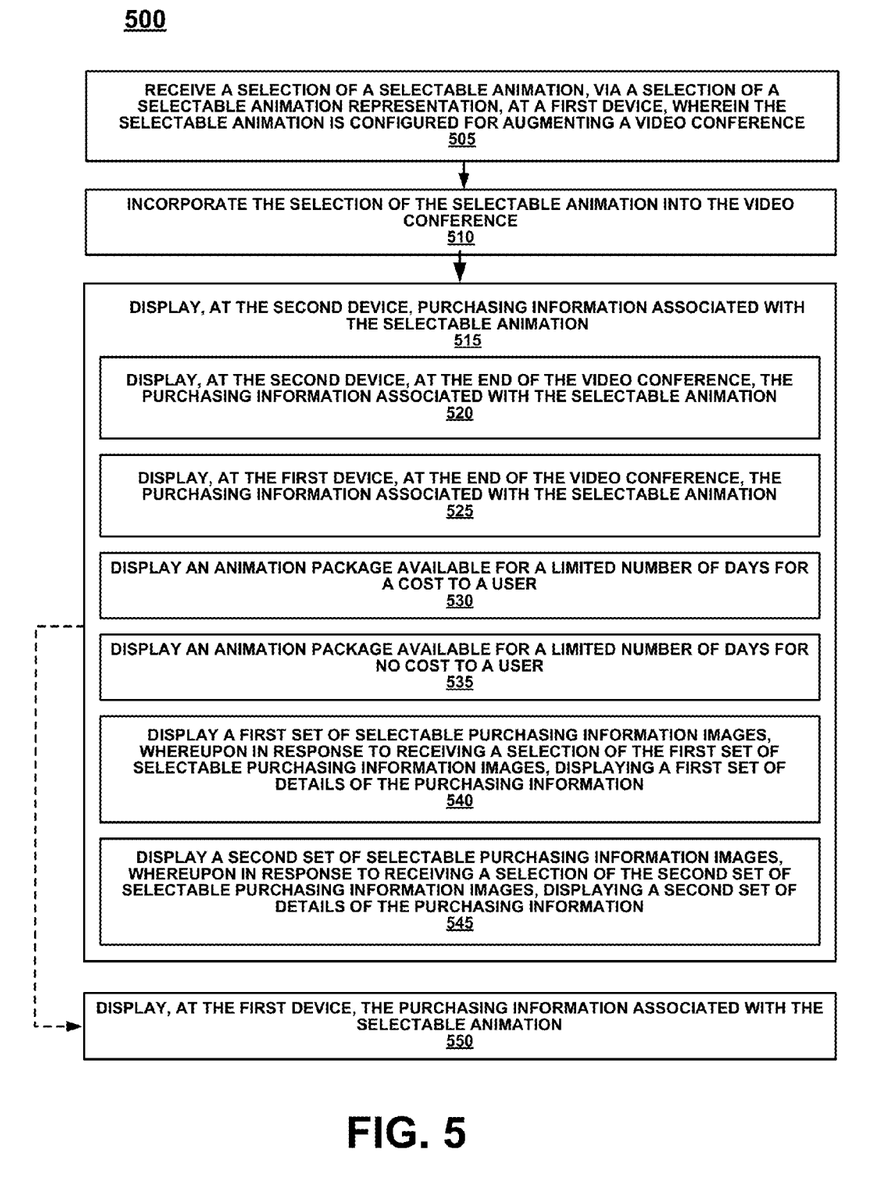
FIG. 5 illustrates an example of a method for augmenting a video conference, in accordance with embodiments.

FIGS. 4 and 5 depict flow charts of methods 400 and 500, in accordance with embodiments, respectively. In various embodiments, methods 400 and 500 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 400 and 500 are performed by devices 100 and/or device 200, as described in FIGS. 1 and 2.

With reference now to FIGS. 1-4, at 405 of method 400, a selection of a selectable animation 190 is received at device 100 (hereinafter, also known as the "first device 100") via a selection of a selectable animation representation. The selectable animation 190 augments the video conference. At 410 of method 400, the selection of the selectable animation 190 is incorporated into the video conference.

In one embodiment, at 415 of method 400, the selectable image 305 is displayed and represents a set of selectable animation representations 191, wherein a selection of the selectable image 305 renders a display of the set of selectable animation representations 191. Further, in one embodiment, at 420 of method 400, in response to receiving a selection of the selectable image 305, the set of selectable animation representations 191 is displayed.

In one embodiment, the displaying of the set of selectable animation representations at operation 420 includes one or more of the following: displaying 425 the set of selectable animation representations 191 in an animation control bar 192 that replaces an existing control bar on a display screen of the first device 100; displaying 430 the set of selectable animation representations 191 in a list format; and displaying 435 the set of selectable animation representations 191 in a carousel format.

In one embodiment, the list format is scrollable. In one embodiment, the carousel format noted above is a format of presenting the set of selectable animation representations 191 such that a finger swipe from one side of the animation control bar 192 to the other moves the set of selectable animation representations 191 further to one side such that animations that were at first hidden appear on the screen while the animations that had originally appeared on the screen become hidden. Furthermore, in one embodiment, when an end of a list in the carousel is reached, the list starts over again from the beginning.

Further, in one embodiment, a search may be made for a desired animation through typing in, or voice activating a search having a particular topic.

In another embodiment, at 440 of method 400, a set of selectable animation representations 191 may be displayed at the first device 100, without being displayed in an animation control bar 192.

In one embodiment, at 445 of method 400, the selection of operation 405 incorporated into the video conference is manipulated at the first device 100, as described herein. At 450 of method 400, in one embodiment, the selection of operation 405 incorporated into the video conference is manipulated at the device 200, as described herein.

In one embodiment, at 455 of method 400, at the end of the video conference, purchasing information associated with the set of selectable animation representations 191 is displayed at the second device 200, as will be described herein. In yet another embodiment, at 460 of method 400, at the end of the video conference, purchasing information associated with the set of selectable animation representations 191 is displayed at the first device 100, as will be described herein.

With reference now to FIGS. 1, 2, 3 and 5, in one embodiment, at 505 of method 500, a selection of a selectable animation 190 is received, wherein the selectable animation 190 is configured for augmenting the video conference. In one embodiment, at 510 of method 500, the selection of operation 505 is incorporated into the video conference. In one embodiment, at 515 of method 500, purchasing information associated with the selectable animation 190 is displayed.

FIG. 6 is an example of a device 100 and/or 200, in accordance with embodiments. With reference not to FIGS. 1, 2, 5 and 6, in one embodiment, at 520 of method 500, the displaying of operation 515 includes displaying at the second device 200, at the end of the video conference, purchasing information 605 associated with the selectable animation 190. Purchasing information 605 may be any information that explains more details regarding the selectable animation 190 used in the call between device 100 and 200, and/or any other selectable animations that are available for use or purchase. For example, in one embodiment, the purchasing information 605 may be the following statement, "Purchase a video effect and use more video effects with all your friends!"

In one embodiment, this purchasing information 605 is contained on a selectable image 610 of a first set of selectable purchasing information images 615. Of note, the first set of selectable purchasing information images 615 may include one or more selectable purchasing information images. For example, in one embodiment, the following purchasing information appears on two separate selectable purchasing information images: "7-Day Pack Use"; and "30-Day Pack Use".

In one embodiment, at 525 of method 500, the purchasing information 605 associated with the selectable animation 190 is displayed at the first device 100 at the end of the video conference. However, in another embodiment, the purchasing information 605 associated with the selectable animation 190 is displayed at the first device 100 at a time that is not at the end of the video conference, as shown at operation 550 of method 500. For example, and referring to FIG. 3, suppose that user 105 selects a locked button of the set of locked buttons 310 as the selectable animation that she desires to be communicated to device 200. However, the locked button does not permit the user 105 from accessing the selectable animation associated with the locked button. In this situation, the device 100 may display, before and/or during the video conference the following purchasing information 605, "Purchase more Video Effects in the Settings Tab".

In one embodiment, at 530 of method 500, the displaying at operation 515 further includes displaying an animation package available for a limited number of days for a cost to a user. For example, the purchasing information may state the following, "7-Day Pack Use $1.99"; and "30-Day Pack Use $3.99". In another embodiment, at 535 of method 500, the displaying of operation 515 further includes the displaying of an animation package available for a limited number of days for no cost to a user. For example, the purchasing information may state the following, "7-Day Pack Use Free Trial".

In yet another embodiment, at 540 of method 500, the displaying of operation 515 further includes displaying a first set of selectable purchasing information images 615, whereupon in response to receiving a selection of the first set of selectable purchasing information images 615, displaying a first set of details 620 of the purchasing information 605.

In one embodiment, at 545 of method 500, the displaying of operation 515 further includes displaying a second set of selectable purchasing information images 625, whereupon in response to receiving a selection of the second set of selectable purchasing information images 625, displaying a second set of details 630 of the purchasing information 605.

Thus, the monetization of the method for augmenting a video conference with one or more animations includes making known to the user of device 100 and/or 200 those animation features that are available for purchase. Various embodiments include providing a sequence of selectable tabs overlaid on a user interface that enable a user to make desired and convenient selections. These choices include, but are not limited to the following: subscribing to packages for a specific monetary amount for a certain period of time; and accepting a free animation "pre-trial". In general, the selectable choices regarding a subscription are generated and communicated to the users of devices 100/200, in some embodiments, at the end of the video conference. As described herein, if it is determined that a user does not possess the required subscription to access particular animations, a subscription offer is then made to the user via purchase information detailed on selectable images.

Of note, the monetization of the use of the device 100 described herein involves the offering of a subscription for a fee, via selectable images containing purchasing information, that is relevant to the user's current situation and anticipated desires.

Various embodiments are thus described. While particular embodiments have been described, it should be appreciated that the embodiments should not be construed as limited by such description, but rather construed according to the following claims.

I claim:

1. A computer-implemented method for augmenting a video conference between a first device and a second device, said method comprising:
 receiving a selection of a recorded selectable animation, via a selection of a selectable animation representation, at said first device, wherein said recorded selectable animation is configured for augmenting said video conference; and
 incorporating said selection of said recorded selectable animation into said video conference, wherein said incorporating comprises:
  superimposing said selection of said recorded selectable animation as an overlay on a video of said video conference on said first device such that a whole of each of said video and said selection of said recorded selectable animation are concurrently viewable.

2. The computer-implemented method of claim 1, further comprising:
 displaying a set of selectable animation representations at said first device.

3. The computer-implemented method of claim 1, further comprising:
 displaying a selectable image representing a set of selectable animation representations, whereupon, a selection of said selectable image renders a display of said set of recorded selectable animations.

4. The computer-implemented method of claim 3, further comprising:
 in response to receiving a selection of said selectable image, displaying said set of selectable animation representations.

5. The computer-implemented method of claim 4, wherein said displaying said set of selectable animation representations comprises:
 displaying said set of selectable animation representations in an animation control bar that replaces an existing control bar on a display screen of said first device.

6. The computer-implemented method of claim 4, wherein said displaying said set of selectable animation representations comprises:
 displaying said set of selectable animation representations in a list format.

7. The computer-implemented method of claim 4, wherein said displaying said set of selectable animation representations comprises:
 displaying said set of selectable animation representations in a carousel format.

8. The computer-implemented method of claim 1, further comprising:
 manipulating, at said first device, said selection of said recorded selectable animation incorporated into said video conference.

9. The computer-implemented method of claim 1, further comprising:
 manipulating, at said second device, said selection of said recorded selectable animation incorporated into said video conference.

10. The computer-implemented method of claim 1, further comprising:
 displaying at said second device, at the end of said video conference, purchasing information associated with a set of selectable animation representations.

11. The computer-implemented method of claim 1, further comprising:
 displaying at said first device, at the end of said video conference, purchasing information associated with a set of selectable animation representations.

12. A device configured for participation in a video conference, said device comprising:
 a display disposed on said device for displaying video captured at a second device;
 an animation selection receiver configured for receiving a selection of a recorded selectable animation, via a selection of a selectable animation representation, wherein said recorded selectable animation is configured for augmenting said video conference;
 an animation incorporator configured for incorporating said selection of said recorded selectable animation into said video captured at said second device; and
 a transmitter for transmitting said video comprising said selection of said recorded selectable animation, wherein said video comprising said selection is configured for being displayed at said second device, wherein said incorporating said selection of said recorded selectable animation into said video comprises:
  superimposing said selection of said recorded selectable animation as an overlay on said video such that a whole of each of said video and said selection of said recorded selectable animation are concurrently viewable.

13. The device of claim 12, further comprising:
 an animation manipulator configured for manipulating said selection of said recorded selectable animation.

14. The device of claim 12, further comprising:
a touch screen display.

15. The device of claim 12, further comprising:
a video camera.

16. The device of claim 12, further comprising:
a microphone.

17. A non-transitory computer-readable storage medium having instructions stored thereon which, when executed, cause a computer processor to perform a method of:
   receiving a selection of a recorded selectable animation, via a selection of a selectable animation representation, at a first device, wherein said recorded selectable animation is configured for augmenting a video conference;
   incorporating said selection of said recorded selectable animation into said video conference; and
   displaying, at a second device, purchasing information associated with said recorded selectable animation, wherein said incorporating said selection of said recorded selectable animation into said video comprises:
      superimposing said selection of said recorded selectable animation as an overlay on said video such that a whole of each of said video and said selection of said recorded selectable animation are concurrently viewable.

18. The non-transitory computer-readable storage medium of claim 17, further comprising instructions for:
   displaying, at said first device, said purchasing information associated with said recorded selectable animation.

19. The non-transitory computer-readable storage medium of claim 17, wherein said displaying comprising:
   displaying, at said second device, at the end of said video conference, said purchasing information associated with said recorded selectable animation.

20. The non-transitory computer-readable storage medium of claim 19, wherein said displaying, at said first device, said purchasing information associated with said recorded selectable animation comprises:
   displaying, at said first device, at the end of said video conference, said purchasing information associated with said recorded selectable animation.

21. The non-transitory computer-readable storage medium of claim 17, wherein said displaying, at said second device, said purchasing information associated with said recorded selectable animation comprising:
   displaying an animation package available for a limited number of days for a cost to a user.

22. The non-transitory computer-readable storage medium of claim 17, wherein said displaying, at said second device, said purchasing information associated with said recorded selectable animation comprising:
   displaying an animation package available for a limited number of days for no cost to a user.

23. The non-transitory computer-readable storage medium of claim 17, wherein said displaying, at said second device, purchasing information associated with said recorded selectable animation comprising:
   displaying a first set of selectable purchasing information images, whereupon in response to receiving a selection of said first set of selectable purchasing information images, displaying a first set of details of said purchasing information.

24. The non-transitory computer-readable storage medium of claim 17, wherein said displaying, at said second device, purchasing information associated with said recorded selectable animation comprising:
   displaying a second set of selectable purchasing information images, whereupon in response to receiving a selection of said second set of second selectable purchasing information images, displaying a second set of details of said purchasing information.

\* \* \* \* \*